United States Patent [19]
Frank et al.

[11] Patent Number: 5,893,166
[45] Date of Patent: Apr. 6, 1999

[54] ADDRESSING METHOD AND SYSTEM FOR SHARING A LARGE MEMORY ADDRESS SPACE USING A SYSTEM SPACE GLOBAL MEMORY SECTION

[75] Inventors: Richard Frank, Groton, Mass.; Gopalan Arun; Richard Anderson, both of Nashua, N.H.; Stephen Klein, Hollis, N.H.

[73] Assignee: Oracle Corporation, Redwood Shores, Calif.

[21] Appl. No.: 847,046

[22] Filed: May 1, 1997

[51] Int. Cl.⁶ ........................................ G06F 12/14
[52] U.S. Cl. .................. 711/163; 711/147; 711/152; 711/202; 711/205; 711/206
[58] Field of Search ..................... 711/147, 152, 711/163, 202, 205, 206

[56] References Cited

U.S. PATENT DOCUMENTS 5,790,851   8/1998   Frank ........................................ 395/674

*Primary Examiner*—Eddie P. Chan
*Assistant Examiner*—T. N. Nguyen
*Attorney, Agent, or Firm*—Wagner,Murabito&Hao

[57] ABSTRACT

An addressing method and computer system for sharing a large memory address space using address space within an operating system's virtual address space. The system provides sharing the SSB over many processes without the disadvantages associated with process based global sections. For instance, the novel system does not require that each process maintain its own dedicated page table entries (PTEs) in order to access the SSB thereby requiring less operating system virtual memory to maintain the PTE data structures. The system uses a process to switch to kernel mode, then identifies those sections of the operating system virtual memory space that are not being used; in some cases the unused address space can be 1.5–1.8 gigabytes in size. The unused address space is linked together to form the SSB. The system alters the privileges of the PTEs corresponding to the SSB so that user mode processes can access this usually protected operating system virtual memory space. The result is a statically mapped large memory address buffer (SSB) that can be immediately shared by all processes within the computer system while consuming only a single statically mapped PTE which all processes can use. In one example, 500 processes mapping to a 2 gigabyte SSB requires only 2 megabytes of memory storage for the corresponding PTEs, assuming conventional memory page sizes. In one example, the SSBs are allocated from a system space virtual memory map which is 2 gigabytes in size in a 32-bit VMS operating system.

26 Claims, 11 Drawing Sheets

ADDRESSING METHOD AND SYSTEM FOR SHARING A LARGE MEMORY ADDRESS SPACE USING A SYSTEM SPACE GLOBAL MEMORY SECTION

BACKGROUND OF THE INVENTION (1) Field of the Invention

The present invention relates to the field of computer systems. More specifically, the present invention relates to the field of memory addressing methods and systems within computer systems.

(2) Prior Art

Large computer systems today contain memory management hardware and software which provide processes with access to a defined range of physical memory (e.g., hardware volatile memory). Operating systems of the computer system utilize memory stored data structures which define and maintain virtual address memory spaces which can be made private to each process. The virtual memory space is then used transparently by the process to access data that is stored within the physical address memory space. The above data structures provide a mapping or "translation" between the addresses of the virtual memory space used by the process and the addresses of the physical memory space used by the computer system's hardware memory management systems which maintain the data in the physical memory. A typical computer system can provide respective memory mappings for as many as 500 or more processes simultaneously.

One prior art memory management system is shown in FIG. 1A. Two virtual address memory spaces are shown as 10a and 10b which correspond to a process 1 and a process 2, respectively. Also shown is a large physical memory address space 20. The physical memory address space 20 is typically realized in volatile memory (e.g., random access memory). According to the memory management system of FIG. 1A, within a 32-bit operating system, the allowed size of each virtual memory space 10a and 10b is approximately 2 gigabytes (GB), with another 2 GB of memory space being reserved for the operating system. The operating system allocates a working set of physical memory to each virtual address space 10a, 10b. Working set 22a is allocated for virtual memory space 10a and working set 22b is allocated for virtual memory space 10b. In a 32-bit operating system, the typical size allowed for a given working set is about 10–20 megabytes (MB), however, in some database applications a maximum of 200 MB can be reserved. In a prior art 32-bit operating system, a maximum of 4 GB of physical memory can be addressed. Therefore, the size of the working set is restricted by the operating system due to fairness concerns so that each process has sufficient access to the 4 GB of physical memory.

A working set is divided into pages of physical memory, e.g., one page 24a is shown for working set 22a and one page 24b is shown for working set 22b. The size of a page is programmable, but one typical size is 8 kilobytes (KB). When a process accesses data, it utilizes addresses within its virtual address space which are converted by a page table data structure into addresses within pages of the process's working set within the physical memory space 20. The operating system uses the page tables of each process to map pages of physical memory space 20 into the virtual address space (10a, 10b) that the process can access.

FIG. 1B illustrates three exemplary page table data structures 30a, 30b and 30n for process 1, process 2, and process n, respectively. The page table data structures 30a, 30b, and 30n are stored in the operating system's address space and maintain the mapping between a process's virtual addresses and the addresses of pages within the physical memory space 20 (FIG. 1A). For each process, virtual addresses are received (e.g., over lines 32a, 32b, and 32n) and the appropriate page address of the physical memory space are output by the tables (e.g., over buses 34a, 34b, and 34n). Since many processes can operate simultaneously (e.g., 500 or more), many page tables can be simultaneously accessed and need to be simultaneously maintained. As discussed further below, in order to share a block of physical memory across several processes, each process requires its own page table to provide the proper address mapping into the shared memory.

In the addressing mechanism of FIG. 1A and FIG. 1B, many more physical memory pages can be mapped by a process than fit within the process' working set. In other words, the virtual memory size in the prior art memory addressing system, for a single process, is very much larger than the allocated working set size. In this case, as additional physical memory pages are needed by the process, they are retrieved from a non-volatile memory storage (e.g., disk 104 of FIG. 1A) and copied into the working set 22a, 22b for that process, overwriting other pages that might currently exist within the working set 22a, 22b. Conversely, if a page of a working set 22a, 22b is not currently required, it is stored in the non-volatile storage 104 to free up space within the working set 22a, 22b for other information. The above "swapping" of pages to and from the non-volatile storage 104 and the volatile working sets 22a, 22b is called "paging." The smaller the working set size, the more disk input/output accesses are required to flow data into and out of the working sets 22a, 22b. Therefore, small working sets reduce the overall performance of the prior art memory addressing mechanism.

To maximize system performance, database processes within a database system require access to shared global memory sections (also called global memory caches) which are shared by all processes. One prior art mechanism utilized for this purpose is a process based global section. Process based global sections are mapped into the address space of each process that requests access to the global section, and thus are subject to the address space management policies and restrictions enforced by the operation system memory management subsystem. For instance, in the prior art, the number of physical pages owned by any one process is limited to the size of its working set or under another quota system. As discussed above, a working set is typically limited to 200 MB in size (400K pages of 2 KB) on 32-bit systems and 520 MB in size (65K pages of 8 KB) on 64-bit systems.

Small working sets increase paging. Paging requirements of the memory management subsystem reduce system performance when using the global sections of the prior art. For instance, accessing pages of the global section of the prior art that are not currently mapped in a process' working set requires mapping of the page into the process to make its individual PTE valid and further requires reading of the page from its backing storage device (e.g., from a hard disk). Each of these tasks reduces system performance. Further, global sections of the prior art require file backing storage, which can use a system page file or an image file. This means that dedicated disk space is needed for essentially all pages that are mapped that exceed the working set restrictions (e.g., to store what is not currently in the working set) thereby also reducing performance, especially for working sets that are very small. In addition, ejecting pages from the process' working set can result in writing the page back to its backing storage device, again reducing performance. What is needed is a system for providing shared memory that is not limited by the above small working set sizes and thereby is not subject to as much paging to and from disk storage.

Another disadvantageous policy of the operating system memory management subsystem is that process level page table entries (PTEs) of the global section are not shared between processes. In a prior art shared global section, a large amount of physical memory is required to maintain the mapping of the shared global section between the processes. Accordingly, each process requires its own PTE data structure to share the global section. Specifically, the physical memory required to store these replicated data structures is typically 8 bytes per PTE times the global section size in pages times the number of processes mapping to the global section. For example, consider 500 processes times (2 GB global section/8K page size) times 8 (bytes per PTE). This equals approximately 1 GB of operating system memory storage for the PTEs required for a 2 GB process based global section. Therefore, in a 32-bit operating system, the 1 GB memory used by the required PTE data structures consumes one quarter of the memory space available (4 GB) to the computer system's operating system. Such large memory usage for memory mapping overhead is not an effective use of memory resources. What is needed is a system for providing shared memory mapping that does not require such large amounts of memory storage to maintain PTE data structures.

The above performance and system memory consumption disadvantages are not alleviated or reduced within computer systems that contain 64-bit operating systems and/or 64-bit directly addressable physical memory spaces under the prior art addressing mechanism. Indeed, within these systems, the above performance and system memory consumption disadvantageous are exacerbated because the required sizes of the page table data structures per process are increased. Moreover, although 64-bit addressable physical memory provides a substantial amount of volatile memory storage, the prior art addressing mechanism still limits the size of the working set to 200 MB or 520 MB per process. This is especially true for 32-bit operating systems having 64-bit directly addressable physical memory. Therefore performance disadvantages result due to heavy disk I/O operations. For 64-bit operating systems having 64-bit directly addressable physical space, the larger limiting factor concerns the immense size of the page table data structures within the operating system's address space.

Accordingly, what is needed is an addressing system that provides a large amount of shared global memory space across many processes without the limitations described above. Specifically, what is needed is an addressing system that provides a large amount of shared global memory space to many processes and is not limited by the above working set sizes so it thereby offers efficient performance. What is further needed is an addressing system that provides a large amount of shared global memory space to many processes and does not consume large amounts of system virtual memory for storing large numbers of PTE data structures. The present invention memory addressing system provides the above features and others not necessarily recited above but which will become clear within discussions of the present invention herein.

SUMMARY OF THE INVENTION

An addressing method and computer system implementing such method are described herein for sharing a large memory address space, called a static system space global memory buffer (SSB), over a plurality of processes wherein the SSB resides within the operating system's virtual memory space. The system of the present invention provides sharing of the large memory address space without the disadvantages associated with process based global sections. For instance, the system of the present invention does not require that each process have its own dedicated page table entries (PTEs) in order to access the SSB thereby requiring much less operating system virtual memory to store the PTE data structures. The system of the present invention uses a process to switch to kernel mode (also called privileged mode), then identifies those sections of the operating system's virtual memory space that are not being used by the operating system; in some cases the unused address space can be 1.5–1.8 gigabytes in size. This unused address space is linked together to form the SSB. The present invention alters the privileges of the PTEs corresponding to the SSB so that user mode processes can access this usually protected operating system memory space. Then the process exits kernel mode. The result is a statically mapped large memory address buffer (SSB) that is immediately available to be shared by all processes within the computer system while consuming only a single statically mapped PTE table which is used by all processes sharing the SSB. In one example, 500 processes mapping to a 2 gigabyte SSB requires only 2 megabytes of memory storage for the corresponding PTEs assuming conventional memory page sizes. In one example, the SSBs are allocated from a system space virtual memory map which is 2 gigabytes in size in a 32-bit Virtual Memory Management System (VMS) operating system.

More specifically, embodiments of the present invention include a memory addressing system in a computer system having a processor coupled to bus, a memory unit coupled to the bus and an operating system, the memory addressing system having: a physical memory map representing addresses of memory cells contained within the memory unit; a statically mapped system space buffer memory, the statically mapped system space buffer memory residing within a first portion of system virtual memory space of the operating system that is reserved for but not used by the operating system; and a table of page table entries that provides address translations from system virtual addresses to physical addresses for memory pages of the statically mapped system space buffer memory, the table used by all processes of the computer system in accessing the statically mapped system space buffer memory and wherein each of the page table entries of the table contain a protection status code set to low privilege such that the all processes have access to the statically mapped system space buffer memory. Embodiments of the present invention also include the above and further having a second portion of the system virtual memory space of the operating system that is reserved and used by the operating system and wherein the table of page table entries is stored within the second portion.

DETAILED DESCRIPTION OF THE INVENTION

In the following detailed description of the present invention, a static system space global memory buffer (SSB) within system virtual memory, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 1A:
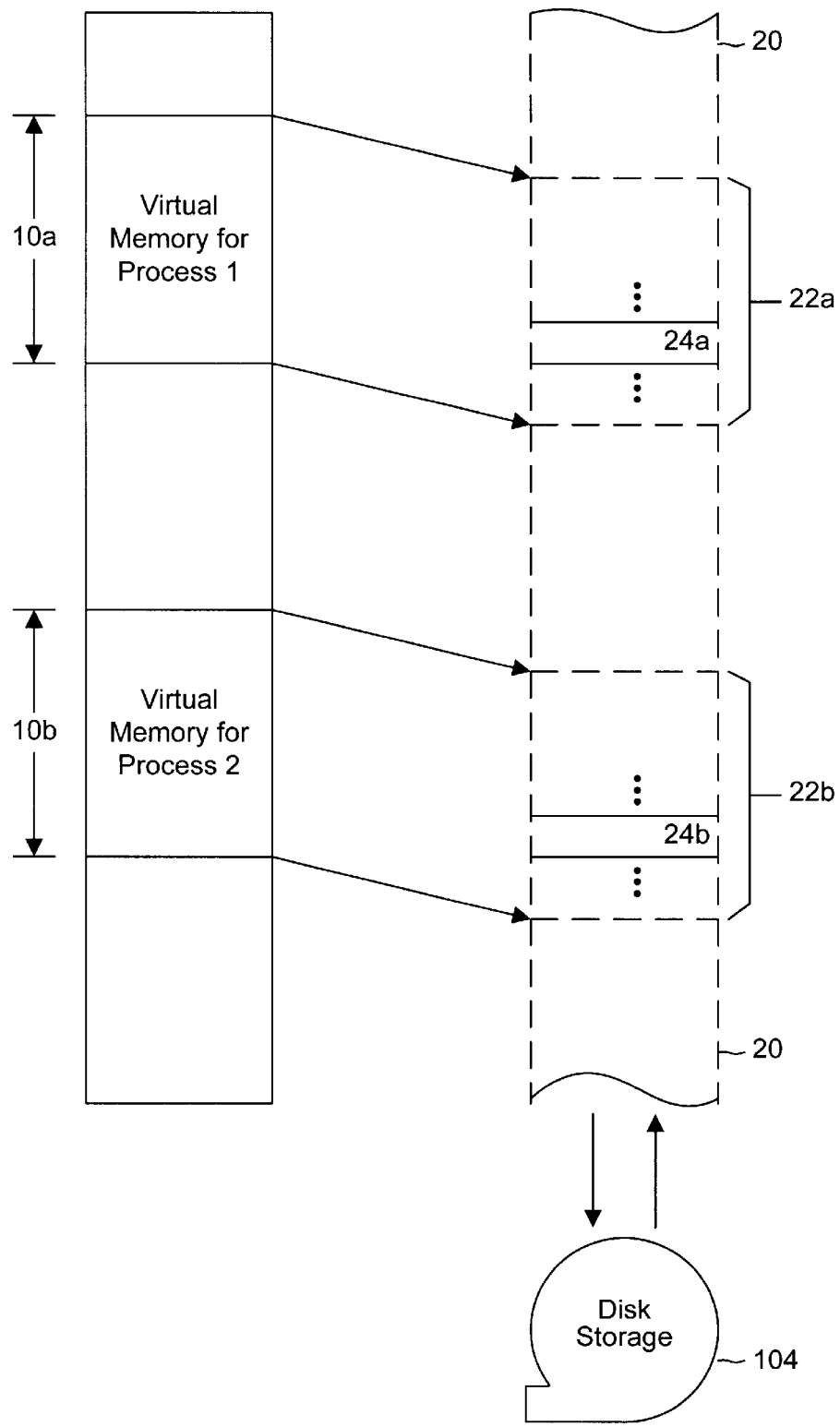
FIG. 1A illustrates a virtual to physical memory mapping system of the prior art.
Figure 1B:
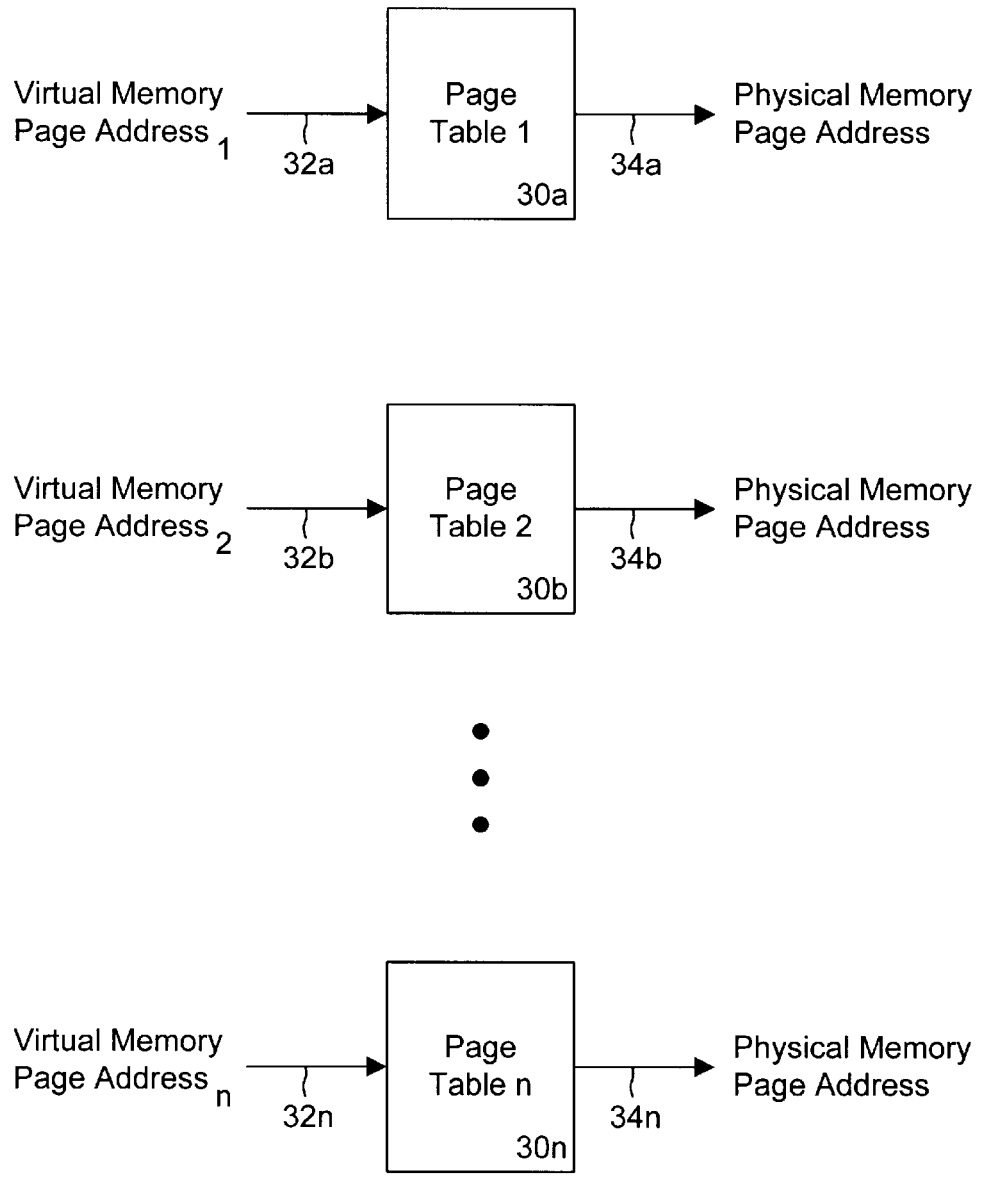
FIG. 1B illustrates page tables used in the prior art virtual to physical memory mapping sytem.
Figure 2:
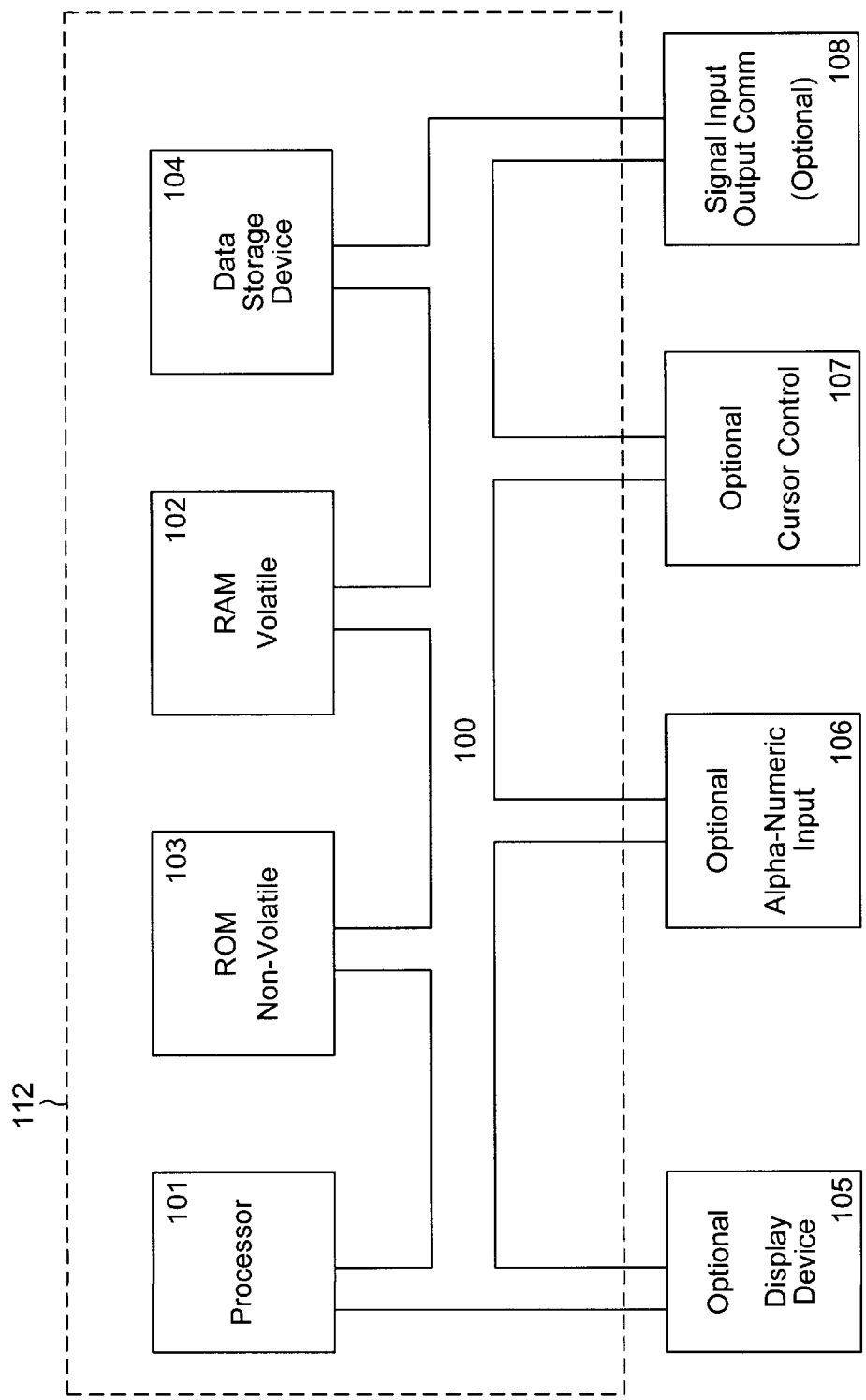
FIG. 2 illustrates a general purpose computer system utilized within the present invention.

Refer to FIG. 2 which illustrates a computer system 112. Within the following discussions of the present invention, certain processes and steps are discussed that are realized, in one embodiment, as a series of instructions (e.g., process 400 and process 500) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In one embodiment, system 112 is a DEC Alpha computer system by Digital Equipment Corporation running the VMS operating system or an x86 architecture computer system.

Addressing System and Method of the Present Invention

Figure 3:
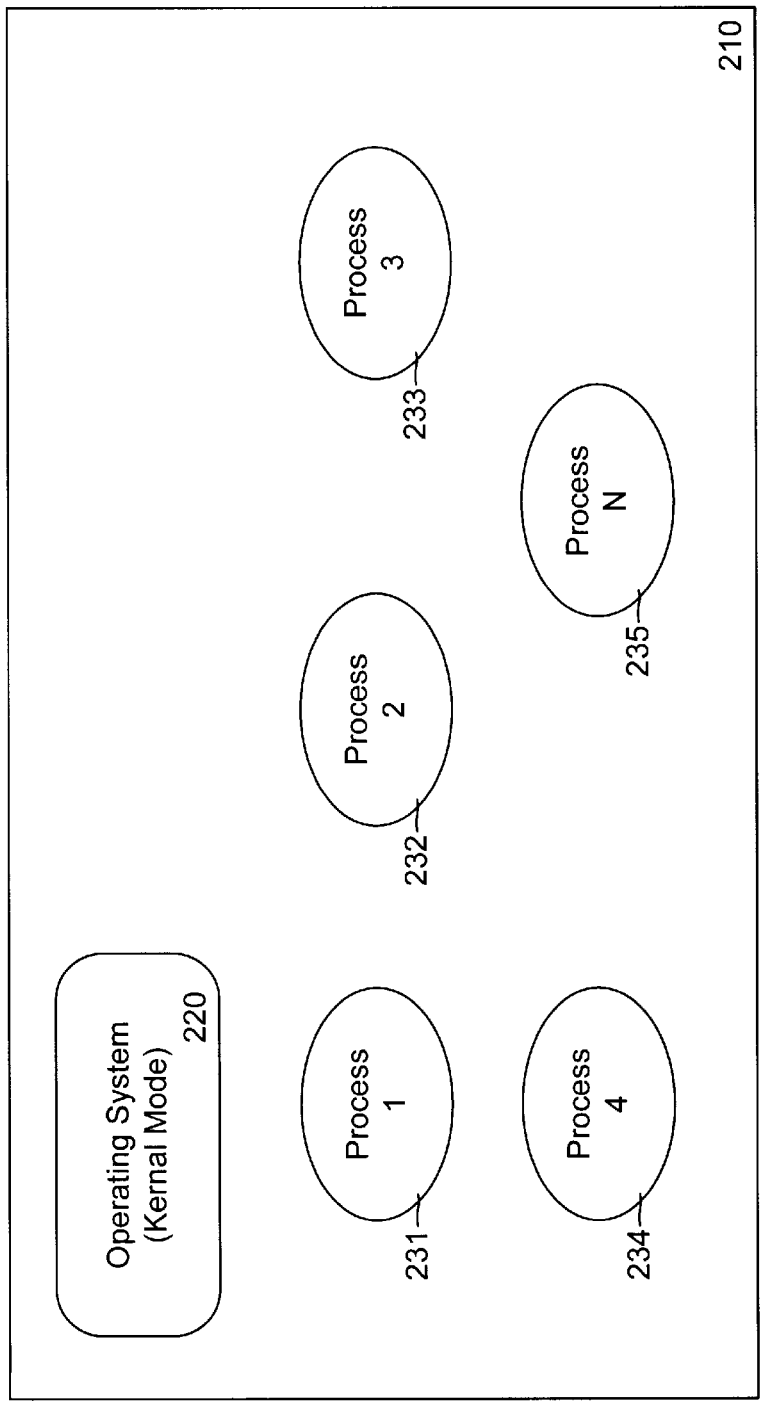
FIG. 3 is a high level diagram illustrating software processes of the system of the present invention including an operating system process and various other processes 1–N (e.g., application processes).

FIG. 3 illustrates a software environment 210 including software processes that operate within system 112 in accordance with the present invention. Within system 112, an operating system 220 executes within kernel mode which is a well known mode of operation in computer systems. In one embodiment, the VMS operating system is used within the present invention, but the present invention can be extended to other operating systems as well, such as Windows, Windows NT, the Apple Macintosh OS, and others. In kernel mode, the operating system 220 is granted special privileges for interfacing with system resources. One such privilege allows the operating system 220 to access certain data structures (e.g., PTEs) within memory 102 (FIG. 2) that other processes might not have the privilege to access. Some operating systems, e.g., Windows, refer to kernel mode as "privilege" mode.

In addition to the operating system 220 of FIG. 3, many other processes can also execute within system 112 and some of these processes are shown as process 1 (231) through process n (235). These can be application programs, etc. In a multi-processor system 112, many of these processes 1–n can be executed in parallel depending on the number of processors within 101 (FIG. 2) that are available.

Figure 4A:
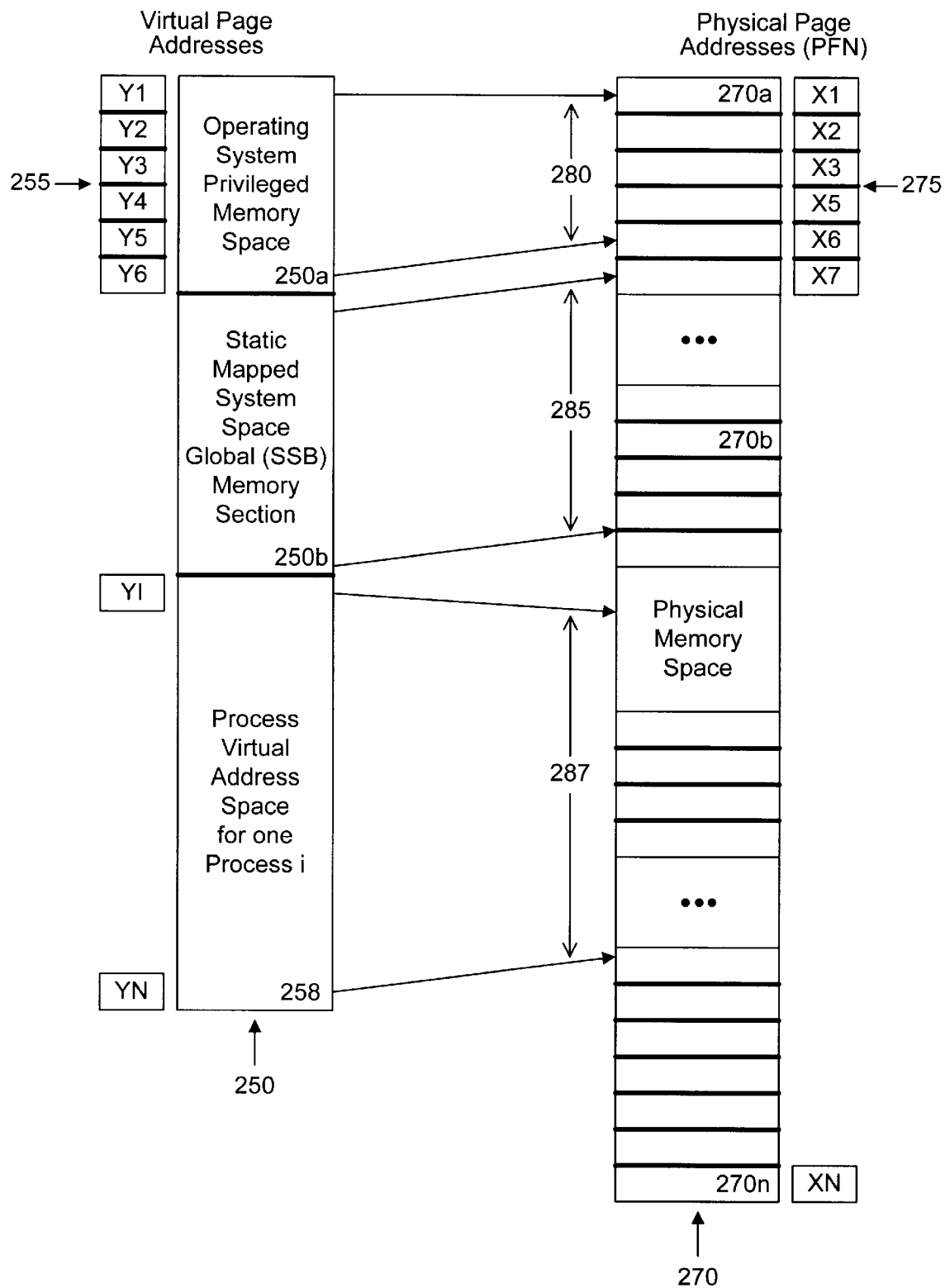
FIG. 4A illustrates a memory mapping for the system space global memory buffer (SSB) of the present invention and a memory mapping for the virtual address space of a single process.

FIG. 4A illustrates a memory map in accordance with the present invention. The virtual memory map 250 and physical memory map 270 are shown. Physical memory map 270 corresponds to the mapping of data physically stored in volatile memory unit 102 (FIG. 2) and the physical memory is addressed by addresses X1 through Xn. Addresses X1 to Xn represent the addresses of memory cells contained within memory 102. Virtual memory map 250 corresponds to the addresses (e.g., Y1 through Yn) used internally by a process of system 112 when accessing data that resides in physical map 270. The SSB of the present invention is shown as operating system virtual memory space 250b and is mapped into physical memory map 270. As described to follow, all processes 1 to n, as well as the operating system 220, share SSB 250b of the present invention.

As shown by memory ranges 280, 285 and 287 of FIG. 4A, virtual addresses (Yi) are translated into physical addresses (Xi) during read/write cycles. System 112 generally reserves a portion of its virtual memory space for the operating system 220. This is generally referred to as "system virtual" memory space and is shown in FIG. 4A as the combination of space 250a and 250b. In one exemplary 32-bit operating system environment, the system virtual memory space represents 2 GB of memory. The remainder of the virtual memory space, 2 GB, is allocated for the other processes (process 1 through process n) and is called "process virtual" memory space. In FIG. 4A, the process virtual memory space is shown as space 258. Both the system and process virtual memory space is indicated as memory map 250. Virtual memory 250 in a 32-bit operating system is addressable up to 4 GB.

The particular memory map 250 shown in FIG. 4A is illustrated with reference to a single process, e.g., process i. This is the case because each process running within system 112 is allocated its own 2 GB of process virtual space 258. A particular process' virtual space can be mapped into different portions of the physical memory map 270. As such, each process of processes 1 to n has its own associated PTE table which maintains the mapping between its own private process virtual memory space and the physical memory space.

Figure 4B:
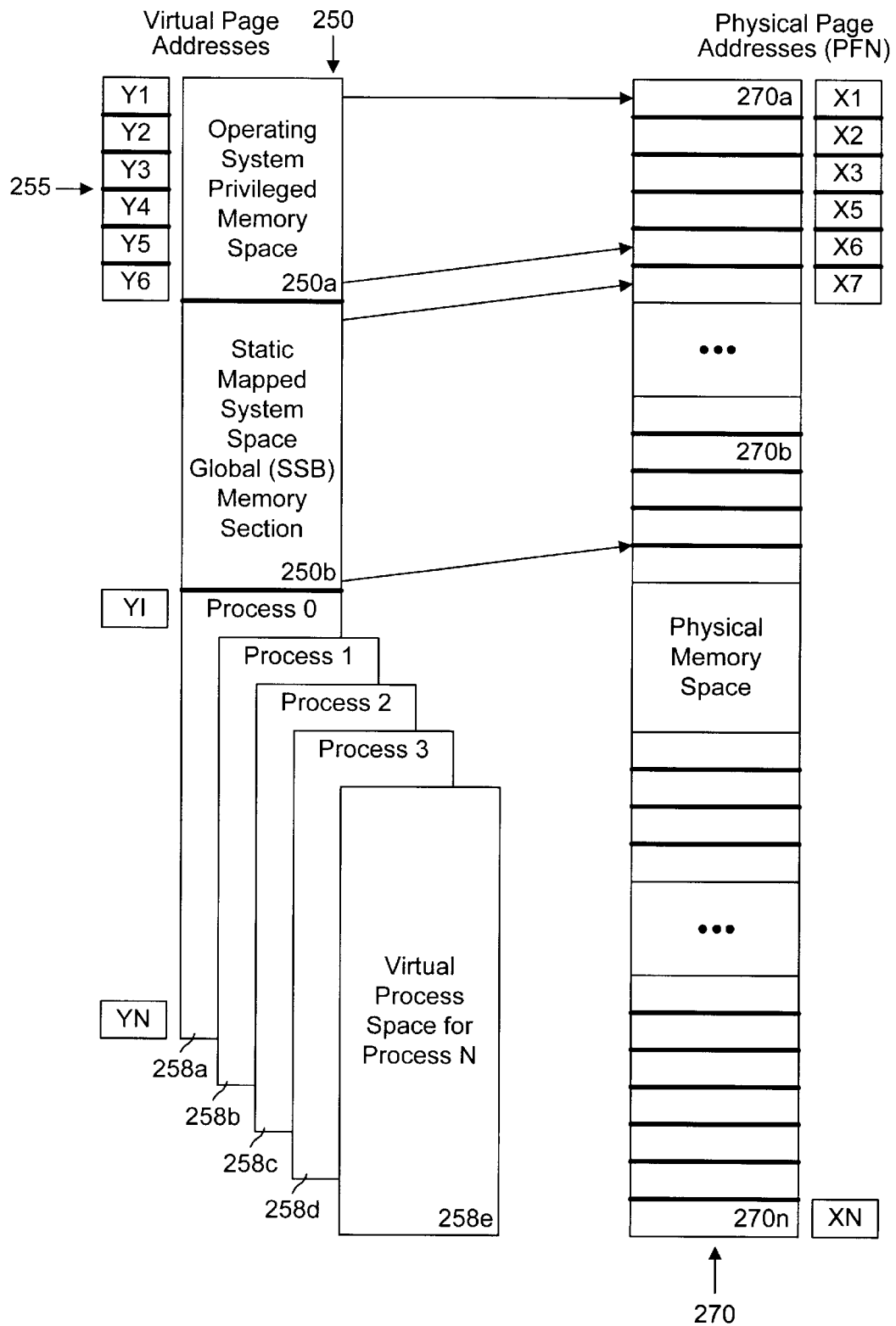
FIG. 4B illustrates a memory mapping for the system space global memory (SSB) of the present invention and the memory mappings for virtual address spaces of many processes.

FIG. 4B illustrates the environment discussed above for processes 1 through n. Although the system virtual memory space (250a and 250b) is used by the operating system 220, process virtual memory space is duplicated with a private copy being provided for each process of 1 to n. In FIG. 4B, for instance, process virtual memory space 258a is provided for process 0, space 258b is for process 1, space 258c is for process 2, space 258d is for process 3, and space 258e is for process n. Each of the process virtual spaces 258a–258d represents 2 GB of addressable space in a 32-bit operating system. As shown in FIG. 4A, with respect to an exemplary single process, all of the process virtual spaces 258a–258d of FIG. 4B can be mapped into different portions of the physical memory map 270.

Figure 5:
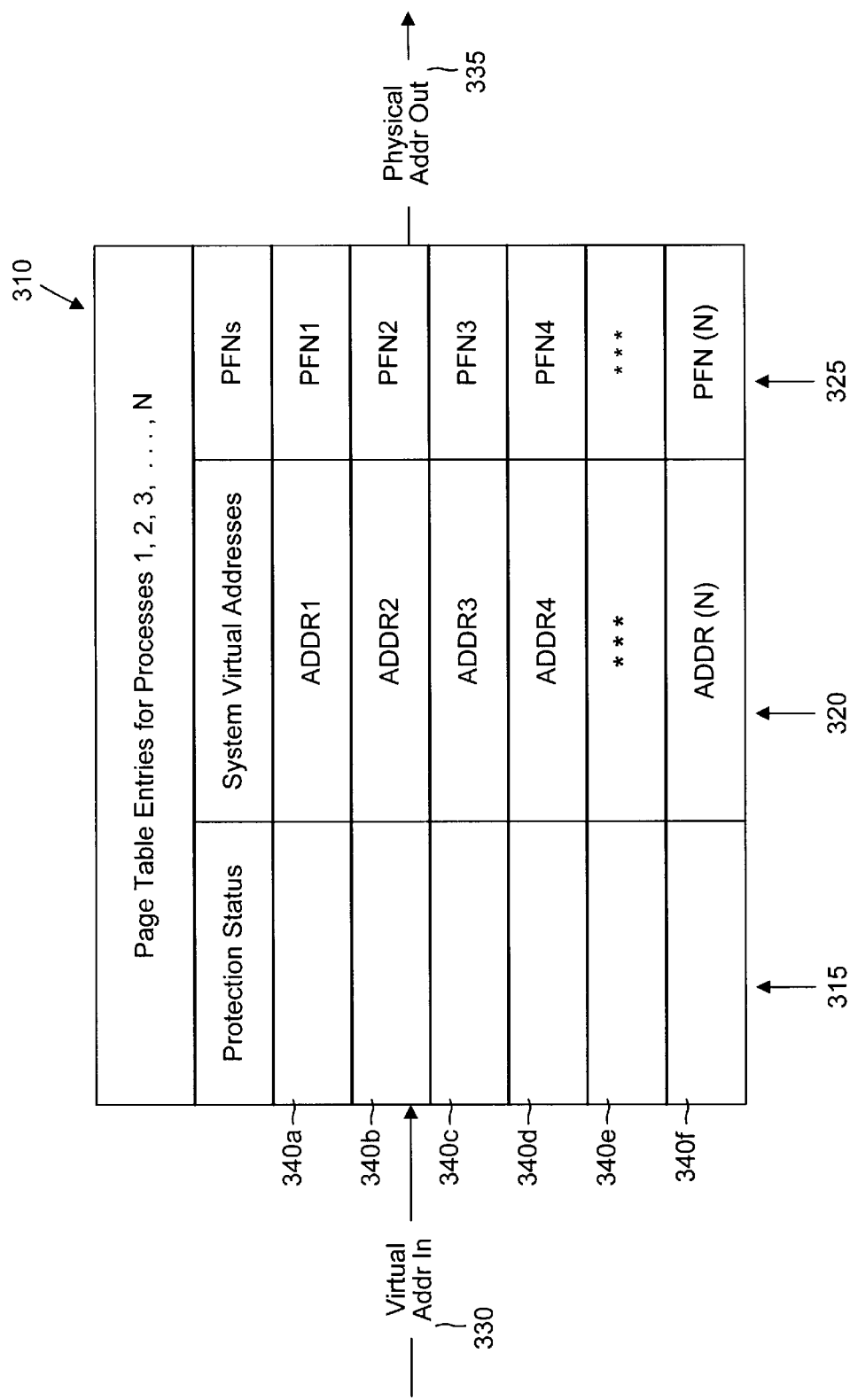
FIG. 5 is a block diagram illustrating page table entries (PTEs) for the SSB of the present invention as shared by all processes for mapping its system virtual address space onto physical memory.
Figure 6:
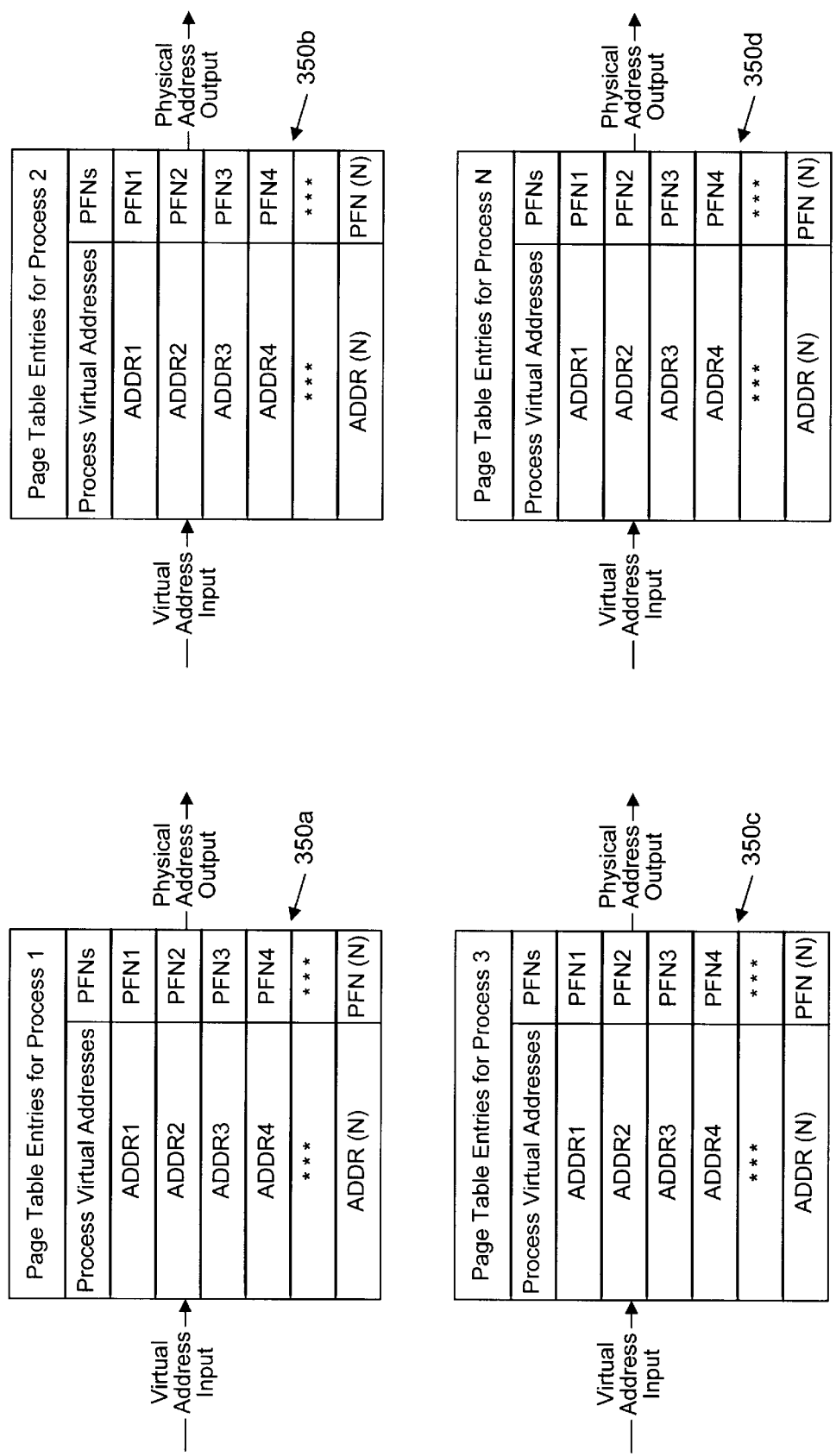
FIG. 6 illustrates individual PTE tables for each of the processes of FIG. 3 which are used to map their respective process virtual address space onto physical memory address space.

Collections of page table entries (PTEs) are used to maintain the memory mapping or translation between virtual memory addresses (Yi) and physical memory addresses (Xi). Physical memory addresses are also called page frame numbers or PFNs. Only one PTE table 310 is required to provide the translation for system virtual memory (250a and 250b) to physical memory. This PTE 310 is shown in FIG. 5. As shown in FIG. 6, a separate PTE table is required to provide the virtual address to physical address translations for each of the processes of process 1 through process n. Four of these PTE tables are shown in FIG. 6. PTE table 350a provides process virtual to physical mapping for process virtual space 285a of process 0, PTE table 350b provides the same mapping for process virtual space 285b of process 1, PTE table 350c provides the same mapping for process virtual space 285c of process 2, and PTE table 350d provides the same mapping for process virtual space 285d of process 3. It is appreciated that in the prior art, processes accessing shared virtual memory space utilize their own respective PTEs to provide the translation required to access the shared memory.

The present invention advantageously provides a mechanism allowing many processes to share the same physical memory space without the requirement that each process maintain its own respective PTEs to access the shared memory. The shared memory buffer (SSB) of the present invention is advantageously situated within system virtual memory and not processor virtual memory 258.

FIG. 4A and FIG. 4B illustrate a system space global (SSB) memory section 250b of the present invention that is created by the present invention and statically mapped to pages (e.g., range 285) of physical memory map 270. This SSB memory section 250b is situated within the system virtual memory of system 112. In accordance with the operation of the present invention, the PTEs that control address translations and access privileges of the SSB memory section 250b are modified such that all processes 1 through n have access to this shared memory through a single PTE grouping. Advantageously, each process does not require its own PTE table in order to access the shared memory of the present invention, therefore, memory resources are not wasted in maintaining a plurality of separate PTEs. As shown below, the SSB memory section 250b can be relatively large, on the order of 1.5 to 1.8 GB in size. Further, since records addressed within the SSB memory section 250b do not need to be mapped and unmapped with respect to a particular process's virtual memory space (e.g., within a process' respective PTEs), access to information addressed within the SSB is very fast and efficient.

Figure 7:
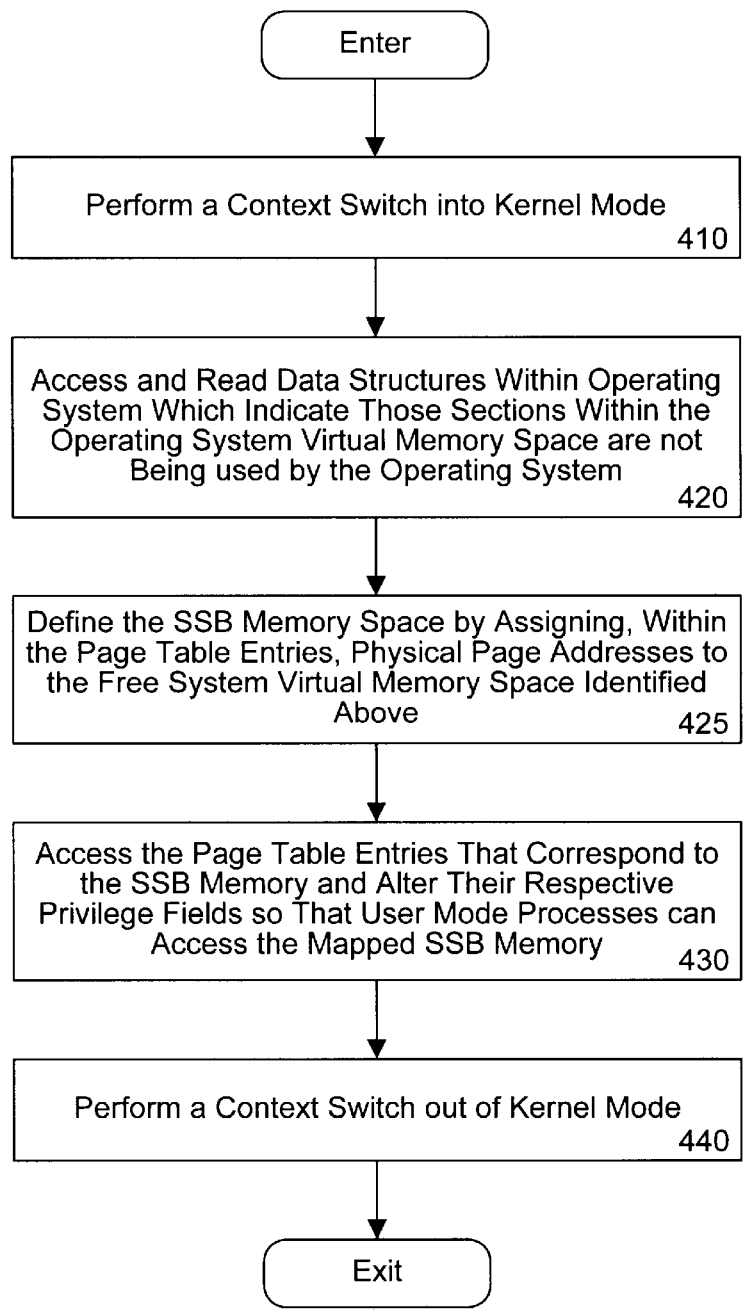
FIG. 7 is a flow diagram illustrating steps used by the present invention for creating an SSB for shared use by many processes.

FIG. 7 illustrates a process 400 executed by system 112 to create the SSB 250b of the present invention. Process 400 is implemented as instruction code stored within computer readable memory units of system 112 and executed by a processor 101. Process 400 is initiated in response to a create SSB command to create an SSB with a particular name. The command can be user originated. An exemplary command syntax is shown below:

CreateSystemSpaceBuffer (size (bytes), bhandle, name, access_mode).

Where size indicates the required size in bytes of the new SSB to be created, bhandle represents an internal name, name represents an external name, and access_mode indicates the lowest processor access privilege allowed for the new SSB to be created. Generally, system 112 creates an SSB sized to hold a set of database objects, described in terms of bytes. The service then returns to the requester a handle identifying the created SSB region. If the size argument is not provided, the present invention will provide an SSB of the required name using all unused system virtual memory available. In this case, the total size of the SSB is limited by the total physical memory in the system and the available system virtual address space that is not already reserved for other uses.

At step 410 of FIG. 7, upon receiving the create SSB command, the present invention causes a first process to perform a context switch into kernel mode. The mechanisms to switch into kernel mode within an VMS operating system (or privileged mode in Windows) are well known and any of a number of well known techniques can be used to perform step 410. Kernel mode of operating system 220 is a mode of operation that grants the first process special privileges to access and modify PTE data structures that are created and maintained by the operating system 220 in section 250a (FIG. 4A) of the system virtual address space.

At step 420, the first process accesses and reads certain data structures within the operating system 220 that indicate those pages of the system virtual address space that are not used by the operating system 220. Typically the operating system 220 consumes only a portion of the system virtual address space that is allocated for its use. This used portion, portion 250a of FIG. 4A, actively stores: 1) the program code (instructions or the kernel code) that make up the operating system 220; 2) various data structures (e.g., PTEs) provided for and used by each process which define the processes' virtual address space; 3) certain drivers and interfaces used internally by the operating system 220; and 4) a general and small extra space that is reserved for operating system use only.

In one exemplary operating system, used portion 250a consumes only 25 percent of the total 2.0 GB allocated for system virtual memory space. The remainder of the system virtual memory space, e.g., portion 250b, is unused system virtual memory space. When physical memory is allocated to portion 250a of the system virtual address space, then individual entries into PTE table 310 (FIG. 5) are added to map pages this used memory space. At step 420, one implementation of the present invention, accesses this PTE table 310 to then determine those portions of the system virtual address space that are not mapped by the operating system and therefore are unused.

At step 425 of FIG. 7, the present invention assigns (e.g., links together) these identified unused portions of the system virtual address space to create the SSB, portion 250b, of the present invention. It is appreciated that FIG. 4A illustrates portion 250a and portion 250b as being mapped to contiguous pages of the physical memory map 270 (maintained in memory 102). However, the mapping of these memory spaces within the present invention does not require such uniform physical memory allocation. Portion 250a and portion 250b within the present invention can be alternatively mapped to discontiguous physical memory pages. Within step 425, the present invention links together the pages of the SSB by constructing page table entries within PTE table 310. This is accomplished by assigning free pages of the physical memory map 270 to the unused pages of the system virtual memory as identified in step 420. By performing this action, the present invention creates a memory map of portion 250b to range 258 of the physical memory map 270 (FIG. 4A). Within the present invention, this map is static in that it is statically mapped to physical pages of memory and not thereafter updated or altered while the corresponding SSB is valid.

At step 430 of FIG. 7, the present invention then alters entries in the PTE table 310 such that the page table entries that define the SSB 250b can be accessed by processes 1–n of system 112. In the prior art, processes 1 to n are not granted privilege to access system virtual memory. However, under the present invention, step 430 grants privileges to processes 1–n of system 112 to access SSB 250b. At step 430, the present invention reads those page table entries of PTE table 310 that correspond to the SSB mapping and sets the privilege code such that processes 1–n can access the SSB 250b.

With respect to step 430, FIG. 5 illustrates some exemplary page table entries 340a to 340f which map system virtual page addresses, ADDR 1 through n (in column 320), to physical page addresses, PFN 1 to n (in column 325).

Associated with each page table entry is a protection status code located in column 315. The protection status code indicates a privilege mode that a process must possess in order to access the page of memory indicated by the respective page table entry. In one embodiment, the protection modes from most privileged to least privileged are called: 1) kernel mode; 2) super mode; 3) executive mode access; and 4) user mode. In the prior art, all system virtual memory space is mapped with the most high privilege (e.g., executive or "kernel" mode) so that only the operating system 220 can access this memory space. At step 430 of FIG. 7, the present invention accesses entries 340a to 340f and in column 315, sets the protection status code to indicate the lowest privilege mode so that processes 1 to n can access the SSB portion 250b. PTE table 310 is a data structure stored in system virtual space 250a, so at step 430, the present invention updates the contents of memory portion 250a to perform the above PTE status modification.

At step 440 of FIG. 7, the present invention then performs a context switch out of kernel mode. At the completion of process 400, the SSB of the present invention is now immediately made available to any application running within processes 1 to n while using only a single PTE table 310. Therefore, the present invention advantageously remaps system virtual memory that is not reserved for the operating system and allows a process to use this memory space. The SSB generated by process 400 can be as large as 1.8 GB in a 32-bit operating system and can be many tera bytes in size in a 64-bit operating system environment.

Figure 8:
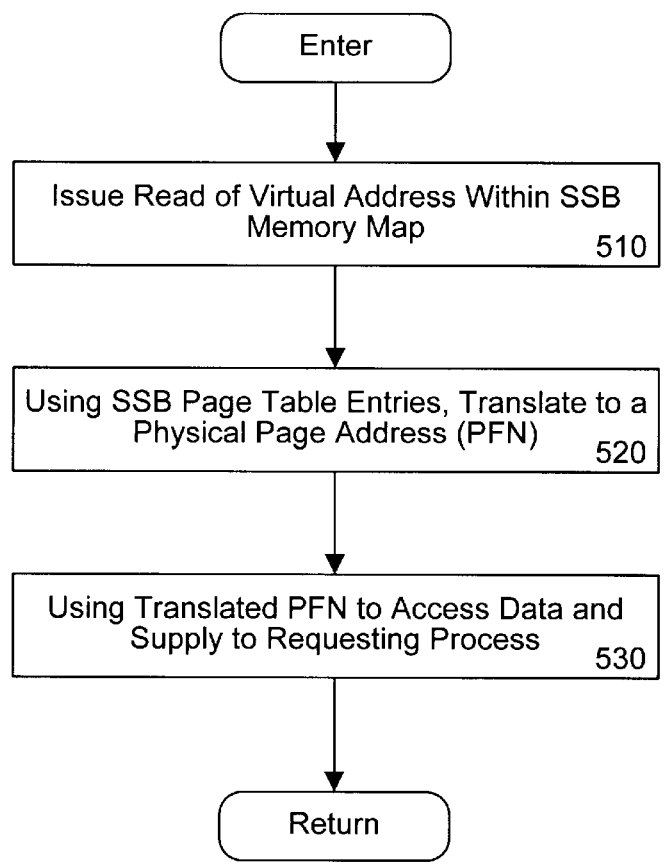
FIG. 8 is a flow diagram illustrating steps used by the present invention when a process uses an existing SSB.

FIG. 8 is a flow diagram illustrates steps within process 500 of the present invention which can be used by a process, of processes 1 to n, for accessing information stored within the shared SSB portion 250b. At step 510, a read access is issued for a virtual address page within the system virtual address space 250b. At step 520, the PTE table 310 is accessed and an input virtual address is used as an index into PTE table 310. Table 310 performs a virtual to physical page address translation by generating a corresponding physical page address which is then output from PTE table 310. At step 530, the physical page address is then used to access the requested information from the physical memory 102 and the information is supplied to the requesting process. Process 500 then terminates. A similar process can also be used for writing information. Each process of process 1 to n uses the same PTEs 310 to access SSB 250b.

It is appreciated that multiple SSBs can be created within address space 250b by issuing multiple non-conflicting CreateSystemSpaceBuffer commands as space allows. Access to these SSBs is then regulated by the buffer name associated to each SSB. Further, the command:

DeleteSystemSpaceBuffer (bhandle)

is used to deallocate an existing SSB. Upon receiving the above command, system 112 deallocates the page table entries that are associated with the SSB identified by the handle, bhandle, thereby freeing up the pages in physical memory 102 and system virtual memory corresponding to these entries.

An SSB is mapped for all processes 1 to n immediately at creation. Therefore, creating an SSB in system virtual address space (with the proper protection) gives access of the SSB to all processes immediately. SSBs of the present invention have the following attributes. An SSB uses a single system PTE (SPTE) per page of global section, within PTE table 310. These page table entries are shared by all processes 1 to n. Therefore, 500 processes mapping a 2 GB SSB consumes only 2 MB of PTE storage memory which is at least an order of magnitude less storage than required compared to the prior art techniques that require each process to maintain its own PTE over shared virtual memory space. Thus, the present invention requires significantly fewer memory resources to maintain the data structures used for address mapping.

In addition, since the pages of the SSBs of the present invention are not paged onto and out-of the hard disk 104 (e.g., they are not pagable), they are not limited in size by working set quotes and memory size maximums. Therefore, the SSB of the present invention is not limited to 200 MB in size as are many working sets. Since the SSBs are not pagable, they do not require non-volatile backing. As such, SSBs can be accessed faster since records and pages are not required from non-volatile backup. The SSB therefore provides a large statically mapped memory space that is not limited in working set sizes and can be accessed very fast. Further, the data structures required to maintain the mapping for SSBs consume relatively little memory. Also, since the SSB is shared to all processes immediately upon creation, a process does not need to map and unmap records in order to access the data within the SSB. This allows a process even faster access to the SSB data. The present invention SSB 250b is not dynamically mapped so a benefit of the SSB of the present invention is that access synchronization is not required between the multiple processes 1 to n.

Figure 9:
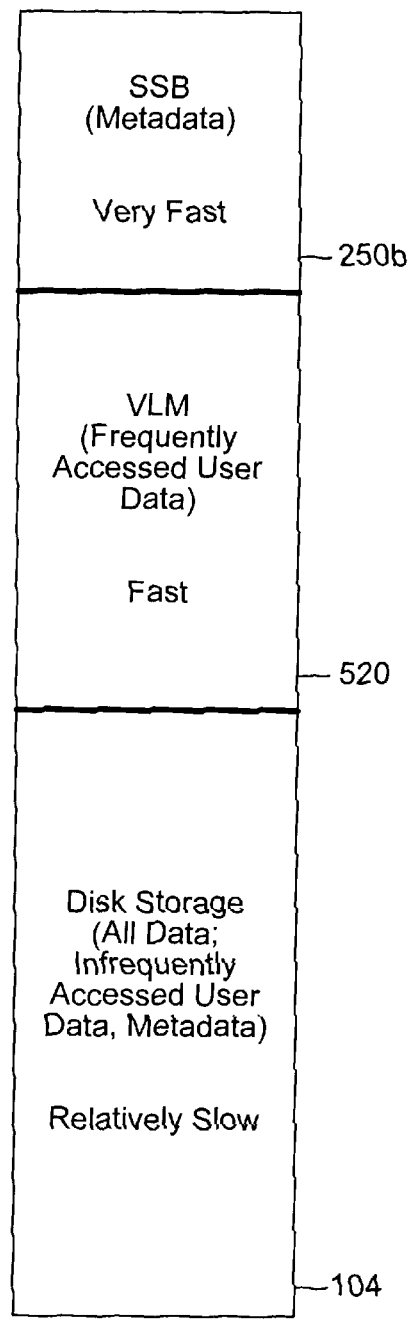
FIG. 9 illustrates a diagram of a memory usage strategy for a relational database system (RDBMS) in accordance with the present invention.

FIG. 9 illustrates a diagram of a memory usage strategy for a relational database system (RDBMS) in accordance with the present invention. Under this memory usage strategy, an SSB 250b of the present invention is created and used to store metadata of the database system. Metadata consists of frequently used data of the RDBMS system. This includes system look-up tables, and data that describes where other data resides within the RDBMS (e.g., definitions of tables, indices, database parameters, database statistics, database objects, etc.). These items are frequently used by all processes and therefore require storage in a shared memory location that has fast access time (e.g., approximately 500 nanoseconds per input/output operation).

Secondly, frequently used user data which typically includes huge volumes of information is stored in the physical memory 102 buffer and accessed via small virtual address windows that are assigned to each process. Records are mapped into and out of these virtual windows. This memory storage 520 is called VLM storage. The technique for VLM storage is described in co-pending patent application Ser. No. 08/695,027, filed Aug. 9, 1996 and entitled "Addressing Method and System for Providing Access of a Very Large Sized Physical Memory Buffer to a Number of Processes," which is incorporated herein by reference. Data stored in VLM storage 520 is accessed relatively quickly but records need to be mapped and unmapped to particular processes' PTEs. On average 500 nanoseconds are used for mapped data and 10–20 microseconds are required to perform a record map operation for initially unmapped records. Lastly, copies of all data, including infrequently used user data, are stored in disk storage 104 that provides a hardened version of this data. Disk storage 104 offers vast storage space but has a relatively slow access time (e.g., about 30 milliseconds per input/output operation).

The preferred embodiment of the present invention, a large buffer memory situated in system virtual memory space and shared among many processes without requiring an individual PTE per process, is thus described. While the present invention has been described in particular embodiments, it should be appreciated that the present invention should not be construed as limited by such embodiments, but rather construed according to the below claims.

What is claimed is:

1. In a computer system having a processor coupled to bus, a memory unit coupled to said bus and an operating system, a memory addressing system comprising:

a physical memory map representing addresses of memory cells contained within said memory unit;

a statically mapped system space buffer memory, said statically mapped system space buffer memory residing within a first portion of system virtual memory space of said operating system that is reserved for but not used by said operating system; and a table of page table entries that provides address translations from system virtual addresses to physical addresses for memory pages of said statically mapped system space buffer memory, said table used by all processes of said computer system in accessing said statically mapped system space buffer memory and wherein each of said page table entries of said table contain a protection status code set to low privilege such that said all processes have access to said statically mapped system space buffer memory.

2. A memory addressing system as described in claim 1 wherein said operating system is a 32-bit operating system.

3. A memory addressing system as described in claim 2 wherein said statically mapped system space buffer memory is approximately 1.5 to 1.8 megabytes in size.

4. A memory addressing system as described in claim 1 further comprising a second portion of said system virtual memory space of said operating system that is reserved and used by said operating system and wherein said table of page table entries is stored within said second portion.

5. A memory addressing system as described in claim 4 wherein said operating system is a VMS operating system.

6. A memory addressing system as described in claim 4 wherein said computer system is an x86 architecture computer system.

7. A memory addressing system as described in claim 4 wherein said computer system is a DEC Alpha computer system.

8. A computer system comprising:

a processor coupled to a bus;

a memory unit coupled to said bus;

an operating system;

a physical memory map representing addresses of memory cells contained within said memory unit;

a statically mapped system space buffer memory, said statically mapped system space buffer memory residing within a first portion of system virtual memory space of said operating system that is reserved for but not used by said operating system; and a table of page table entries that provides address translations from system virtual addresses to physical addresses for memory pages of said statically mapped system space buffer memory, said table used by all processes of said computer system in accessing said statically mapped system space buffer memory and wherein each of said page table entries of said table contain a protection status code set to low privilege such that said all processes have access to said statically mapped system space buffer memory.

9. A computer system as described in claim 8 wherein said operating system is a 32-bit operating system.

10. A computer system as described in claim 9 wherein said statically mapped system space buffer memory is approximately 1.5 to 1.8 megabytes in size.

11. A computer system as described in claim 8 further comprising a second portion of said system virtual memory space of said operating system that is reserved and used by said operating system and wherein said table of page table entries is stored within said second portion.

12. A computer system as described in claim 11 wherein said operating system is a VMS operating system.

13. A computer system as described in claim 11 wherein said computer system is an x86 architecture computer system.

14. A computer system as described in claim 11 wherein said computer system is a DEC Alpha computer system.

15. A method of providing a buffer of memory that can be shared between a plurality of processes within a computer system having an operating system, said method comprising the steps of:

a) switching into kernel mode of said operating system;
b) identifying a first portion of system virtual memory space that is reserved by said computer system for said operating system but not used by said operating system;
c) mapping said first portion of system virtual memory space into pages of physical memory space of said computer system by constructing respective page table entries within a single table, said respective page table entries corresponding to respective pages of said first portion;
d) modifying respective protection status codes of said respective page table entries such that said plurality of processes can access said pages of said first portion;
e) switching out of said kernel mode; and
f) said plurality of processes accessing said single table to share said first portion of system virtual memory space.

16. A method as described in claim 15 wherein said operating system is a 32-bit operating system.

17. A method as described in claim 2 wherein said first portion of said system virtual memory space is approximately 1.5 to 1.8 megabytes in size.

18. A method as described in claim 15 further comprising the step of storing said single table into a second portion of said system virtual memory space of said operating system that is reserved and used by said operating system.

19. A method as described in claim 18 wherein said operating system is a VMS operating system.

20. A method as described in claim 18 wherein said computer system is a DEC Alpha computer system.

21. In a computer system having a processor coupled to a bus, a computer readable memory coupled to said bus and storing instructions that when executed by said processor implement a method of providing a buffer of memory that can be shared between a plurality of processes within a computer system having an operating system, said method comprising the steps of:

a) switching into kernel mode of said operating system;
b) identifying a first portion of system virtual memory space that is reserved by said computer system for said operating system but not used by said operating system;
c) mapping said first portion of system virtual memory space into pages of physical memory space of said computer system by constructing respective page table entries within a single table, said respective page table entries corresponding to respective pages of said first portion;
d) modifying respective protection status codes of said respective page table entries such that said plurality of processes can access said pages of said first portion;
e) switching out of said kernel mode; and
f) said plurality of processes accessing said single table to share said first portion of system virtual memory space.

22. A computer readable memory as described in claim 21 wherein said operating system is a 32-bit operating system.

23. A computer readable memory as described in claim 21 wherein said first portion of said system virtual memory space is approximately 1.5 to 1.8 megabytes in size.

24. A computer readable memory as described in claim 21 wherein said method further comprises the step of storing said single table into a second portion of said system virtual memory space of said operating system that is reserved and used by said operating system.

25. A computer readable memory as described in claim 24 wherein said operating system is a VMS operating system.

26. A computer readable memory as described in claim 24 wherein said computer system is a DEC Alpha computer system.

* * * * *

UNITED STATES PATENT AND TRADEMARK OFFICE
CERTIFICATE OF CORRECTION

| | | |
|---|---|---|
| PATENT NO. | : 5,893,166 | Page 1 of 1 |
| APPLICATION NO. | : 08/847046 | |
| DATED | : April 6, 1999 | |
| INVENTOR(S) | : Richard Frank et al. | |

It is certified that error appears in the above-identified patent and that said Letters Patent is hereby corrected as shown below:

Claim 3, column 12, line 41, delete "is approximately" and insert --has range from--

Claim 10, column 13, line 12, delete "is approximately" and insert --has range from--

Claim 17, column 13, line 48, delete "claim 2" and insert --claim 16--

Claim 17, column 13, line 50, delete "is approximately" and insert --has range from--

Claim 23, column 14, line 39, delete "is approximately" and insert --has range from--

Signed and Sealed this
Third Day of July, 2012

David J. Kappos
*Director of the United States Patent and Trademark Office*